United States Patent
Kim

(10) Patent No.: US 9,120,923 B2
(45) Date of Patent: Sep. 1, 2015

(54) THERMOPLASTIC ELASTOMER COMPOUNDS EXHIBITING SUPERIOR COMPRESSION SET PROPERTIES

(75) Inventor: Sehyun Kim, Deer Park, IL (US)

(73) Assignee: PolyOne Corporation, Avon Lake, OH (US)

( * ) Notice: Subject to any disclaimer, the term of this patent is extended or adjusted under 35 U.S.C. 154(b) by 71 days.

(21) Appl. No.: 14/122,287

(22) PCT Filed: May 30, 2012

(86) PCT No.: PCT/US2012/039960
§ 371 (c)(1),
(2), (4) Date: Nov. 26, 2013

(87) PCT Pub. No.: WO2012/166779
PCT Pub. Date: Dec. 6, 2012

(65) Prior Publication Data
US 2014/0094538 A1    Apr. 3, 2014

Related U.S. Application Data

(60) Provisional application No. 61/491,555, filed on May 31, 2011.

(51) Int. Cl.
*C08L 23/22* (2006.01)
*C08L 71/12* (2006.01)
*C08L 53/00* (2006.01)

(52) U.S. Cl.
CPC ............ *C08L 23/22* (2013.01); *C08L 71/12* (2013.01); *C08L 53/00* (2013.01)

(58) Field of Classification Search
CPC .......... C08L 23/22; C08L 53/00; C08L 71/12
See application file for complete search history.

(56) References Cited

U.S. PATENT DOCUMENTS

| 7,105,611 B2 | 9/2006 | Kimura et al. |
| 2006/0229402 A1 | 10/2006 | Varma |
| 2007/0112132 A1 | 5/2007 | Zhao et al. |
| 2009/0283973 A1 | 11/2009 | Koh et al. |
| 2010/0152320 A1 | 6/2010 | Youn et al. |

OTHER PUBLICATIONS

Marshall et al., "A Novel Isobutylene-based TPV," 64th Annual Conference of the Society of Plastics Engineers (ANTEC 2006), 2006, pp. 2107-2110.

*Primary Examiner* — Kriellion Sanders
(74) *Attorney, Agent, or Firm* — John H. Hornickel; Michael J. Sambrook

(57) ABSTRACT

A blend of polyisobutylene-based thermoplastic vulcanizate, styrene-ethylene-ethylene-propylene-styrene, low molecular weight liquid polybutene, polyolefin, polyphenylene ether, and, optionally, filler is disclosed which has good processability, lower compression set, and more effective barrier properties for oxygen than the same blend without the styrene-ethylene-ethylene-propylene-styrene and the polyphenylene ether. The blend is superior in oxygen transmission rate properties than a conventional styrenic block copolymer containing thermoplastic elastomer.

8 Claims, No Drawings

THERMOPLASTIC ELASTOMER COMPOUNDS EXHIBITING SUPERIOR COMPRESSION SET PROPERTIES

CLAIM OF PRIORITY

This application claims priority from U.S. Provisional Patent Application Ser. No. 61/491,555 filed on May 31, 2011, which is incorporated by reference.

FIELD OF THE INVENTION

This invention relates to thermoplastic elastomers containing functional additive to provide superior compression set and barrier properties.

BACKGROUND OF THE INVENTION

The world of polymers has progressed rapidly to transform material science from wood and metals of the $19^{th}$ Century to the use of thermoset polymers of the mid-$20^{th}$ Century to the use of thermoplastic polymers of later $20^{th}$ Century.

An example of a popular rubber is butyl rubber which has excellent gas barrier and compression set properties. But because butyl rubber is a thermoset, it is not capable of being injection molded and then recycled When butyl rubber is compression molded, it has a relatively longer cure time in comparison to an injection molding process.

Thermoplastic elastomers (TPEs) combine the benefits of elastomeric properties of thermoset polymers, such as vulcanized rubber, with the processing properties of thermoplastic polymers. Therefore, TPEs are preferred because they can be made into articles using injection molding equipment. But TPEs lack gas barrier properties and compression set properties comparable to butyl rubber.

SUMMARY OF THE INVENTION

What the art needs is a new formulation of thermoplastic elastomer (TPE) compounds that have gas barrier properties and a low compression set approaching those properties of butyl rubber.

The present invention solves that problem by using a TPE formulation which utilizes different types of thermoplastic elastomers and thermoplastic resins.

"Compression set" is identified by ASTM D395 to be the permanent deformation remaining after release of a compressive stress. Compression set is expressed as the percentage of the original specimen thickness for Method A (constant force) or the percentage of the original deflection for Method B (constant deflection). Compression set is an important property for elastomers and cushioning materials. For purposes of this invention, Method B will be used.

Generally, the lower the compression set percentage, the better the TPE compound can withstand stress and return to its prior normal condition. Therefore, a lower compression set percentage is indicative of superior elastomeric performance.

Compression set can be expressed as:

$$C_B = [(t_o - t_i)/(t_o - t_n)] \times 100$$

where $C_B$=Compression set; $t_o$=Original thickness of the specimen; $t_i$=Final thickness of the specimen; and $t_n$=thickness of the space bars used.

One aspect of the invention is a thermoplastic elastomer compound, comprising (a) thermoplastic vulcanizate (TPV) masterbatch of crosslinked polyisobutylene, polyolefin other than polybutene, and a plasticizer selected from the group consisting of polybutene, paraffin oil, and combinations of them; (b) styrene ethylene ethylene propylene styrene (SEEPS); (c) liquid polybutene; (d) additional polyolefin selected from the group consisting of polyethylene, polypropylene, and both polyethylene and polypropylene; (e) polyphenylene ether; and (f) optionally, filler; wherein the compound has a compression set of less than about 22% when tested at 23° C. for 22 hours using ASTM D395 Test Method B.

Another aspect of the invention is a molded article of the above compound.

Features of the invention will become apparent with reference to the following embodiments.

EMBODIMENTS OF THE INVENTION

TPV Masterbatch

The first ingredient is a thermoplastic vulcanizate compound, desirably a crosslinked isobutylene-based TPV containing (a) dynamically crosslinked polyisobutylene (PIB), (b) polyolefin other than polybutene, and (c) plasticizer of polybutene or paraffin oil. The PIB can be prepared from cationic living polymerization of isobutylene, followed by followed by an introduction of an active group at both chain ends for a secondary hydrosilylation vulcanization step in the presence of a crosslinking agent, preferably a silane crosslinking agent.

As identified by Kaneka Texas Corporation, a marketer of this TPV, the dynamic vulcanization of PIB creates a more stable chemical crosslinked network of PIB rubbery phase in the TPV system. It is also noted that the hydrosilylation technique works reasonably well to form the chemical crosslinking in the inert PIB portion.

Optionally, the TPV can also contain styrene-isobutylene-styrene (SIBS) in addition to or in replacement of the polyolefin other than polybutene. If SIBS is used, then no plasticizer is needed.

More particularly, the TPV utilizes the combination of crosslinked PIB with polypropylene or high density polyethylene (HDPE) in the presence of polybutene plasticizer. TPVs of this combination are commercially available from Kaneka Texas Corporation using the Sibstar™ brand as, P1140B; E1140; and E1140B grades, with the last being preferred. This E1140B grade uses HDPE as a modifier resin of 8 weight percent, has a crosslinked rubber content of 66 weight percent and a polybutene oil content of 26 weight percent. Commercially available grades of TPVs using SIBS are S1100 and S4300 grades.

These Sibstar™ branded TPVs provide low compression set at high temperatures, according to commercial literature from Kaneka Texas Corporation. Table 1 shows the various physical properties of these Sibstar™ TPVs, according to information published by Kaneka.

In an article published for ANTEC 2006, Marshall et al., "A Novel Isobutylene-Based TPV", ANTEC 2006, pp 2107-2110, Kaneka reported that this type of TPV could be used as a masterbatch to design finished compounds depending upon mechanical property requirements, such as hardness, tensile strength, etc. through the incorporation of additional polypropylene or plasticizers.

This invention yields unexpected results from a different combination of ingredients for the TPE compound.

TABLE 1

TPVs and Their Properties

| Item | Units | S1100 | S4300 | P1140B | E1140 | E1140B |
|---|---|---|---|---|---|---|
| Resin | | SIBS | SIBS | r-PP | HDPE | HDPE |
| Resin | Wt. % | 10 | 30 | 8 | 8 | 8 |
| Rubber | | Isobutylene | Isobutylene | Isobutylene | Isobutylene | Isobutylene |
| Rubber | Wt. % | 90 | 70 | 66 | 66 | 66 |
| Oil | | None | None | Polybutene | Paraffin | Polybutene |
| Oil | Wt. % | 0 | 0 | 26 | 26 | 26 |
| Specific Gravity | g/cm$^3$ @ 23° C. | 0.92 | 0.93 | 0.91 | 0.91 | 0.91 |
| Hardness | JIS-A | 33 | 35 | 42 | 37 | 39 |
| Compression Set | 70° C., 22 hr. | 15 | 30 | 10 | 10 | 10 |
| Compression Set | 100° C., 22 hr. | 50 | 55 | 10 | 10 | 10 |
| Compression Set | 121° C., 72 hr. | 57 | 86 | 11 | 25 | 25 |
| Tensile strength at break | MPa | 2.3 | 10 | 2.1 | 2.3 | 2.6 |
| Modulus at 100% | MPa | 0.7 | 0.7 | 1.0 | 1.2 | 0.8 |
| Elongation at break | % | 350 | 550 | 380 | 290 | 440 |
| Viscosity | Poise @ 200° C., 1200 sec$^{-1}$ | 7900 | 7100 | 3700 | 5200 | 5100 |

SEEPS

A styrenic block copolymer is useful. This copolymer is styrene-ethylene-ethylene/propylene-styrene ("SEEPS"). The SEEPS contributes the ability to better retain oil in the compound. Because a component of the preferred TPV is HDPE, SEEPS is chosen over the use of styrene-ethylene-butylene-styrene (SEBS) or the use of styrene-ethylene-propylene-styrene (SEPS) because SEEPS is more compatible with HDPE than either of SEBS or SEPS is. Also, as seen in the Examples below, the presence of SEEPS in the TPE compound causes a reduction in compression set by a considerable amount compared with the Sibstar™ compounds which do not contain SEEPS. Septon 4055 SEEPS is presently preferred, commercially available from Kuraray Co., LTD.

Plasticizer

A plasticizer is useful. For TPE compounds of the present invention, the plasticizer can be a liquid polybutene, commercially available from Ineos in any number of grades marketed under the Indopol™ brand. Presently preferred is the Indopol™ H-300 grade of polybutene oligomer, which has a number average molecular weight of about 1300, a polydispersity index (Mw/Mn) of about 1.65, and a flash point of greater than 230° C. The plasticizer contributes flexibility, lower viscosity, and barrier properties to the TPE compound. Also, as seen in the Examples below, the presence of this plasticizer in at least 15 weight percent is important to the properties of the TPE compound.

Polyolefins as Secondary Polymer

In the present invention, the TPE compound includes polyethylene or polypropylene or both to contribute processability and compression set to the TPE compound. Of the olefins, high density polyethylene (HDPE) and/or polypropylene (PP) are preferred. Those olefins are commercially available from a number of sources.

Polyphenylene Ether

The TPE compound also includes polyphenylene ether (PPE) as a modifier of the TPE compound. PPE specifically contributes compression set to the TPE compound.

Filler

Filler is optionally included in the TPE compound. Presently calcium carbonate is preferred. The filler contributes density, compression set, processability and cost reduction to the TPE compound.

Other Optional Additives

The compound of the present invention can include other conventional plastics additives in an amount that is sufficient to obtain a desired processing or performance property for the compound. The amount should not be wasteful of the additive nor detrimental to the processing or performance of the compound. Those skilled in the art of thermoplastics compounding, without undue experimentation but with reference to such treatises as *Plastics Additives Database* (2004) from Plastics Design Library (www.williamandrew.com), can select from many different types of additives for inclusion into the compounds of the present invention.

Non-limiting examples of optional additives include adhesion promoters; biocides (antibacterials, fungicides, and mildewcides), anti-fogging agents; anti-static agents; dispersants; fillers and extenders; fire and flame retardants and smoke suppressants; initiators; lubricants; micas; pigments, colorants and dyes; oils and plasticizers; processing aids; release agents; silanes, titanates and zirconates; slip and anti-blocking agents; stabilizers; stearates; ultraviolet light absorbers; viscosity regulators; waxes; and combinations of them. Of these optional additives, waxes and antioxidants are often used.

Table 2 shows the acceptable and desirable ranges of ingredients for the compound of the present invention. The compound can comprise, consist essentially of, or consist of the following ingredients.

TABLE 2

Ranges of Ingredients

| Ingredient (Wt. Percent) | Acceptable | Desirable |
|---|---|---|
| PIB - Containing TPV | 25-60% | 40-50% |
| SEEPS | 8-12% | 9-11% |
| Liquid Polybutene Plasticizer | 15-30% | 18-22% |
| Polyolefin(s) | 5-10% | 5-8% |
| Polyphenylene Ether | 3-8% | 4-6% |
| Filler | 0-35% | 7-12% |
| Anti-oxidant | 0-1% | 0-0.2% |
| Other Optional Additives | 0-10% | 0-2% |

Processing

The preparation of compounds of the present invention is uncomplicated. The compound of the present can be made in batch or continuous operations.

Mixing in a continuous process typically occurs in an extruder that is elevated to a temperature that is sufficient to melt the polymer matrix with addition at the head of the extruder. Extruder speeds can range from about 50 to about 500 revolutions per minute (rpm), and preferably from about 300 to about 500 rpm. Typically, the output from the extruder is pelletized for later extrusion or molding into polymeric articles.

Mixing in a batch process typically occurs in a Banbury mixer that is also elevated to a temperature that is sufficient to melt the polymer matrix to permit addition of the solid ingredient additives. The mixing speeds range from 60 to 1000 rpm. Also, the output from the mixer is chopped into smaller sizes for later extrusion or molding into polymeric articles.

Subsequent extrusion or molding techniques are well known to those skilled in the art of thermoplastics polymer engineering. Without undue experimentation but with such references as "Extrusion, The Definitive Processing Guide and Handbook"; "Handbook of Molded Part Shrinkage and Warpage"; "Specialized Molding Techniques"; "Rotational Molding Technology"; and "Handbook of Mold, Tool and Die Repair Welding", all published by Plastics Design Library (www.williamandrew.com), one can make articles of any conceivable shape and appearance using compounds of the present invention.

USEFULNESS OF THE INVENTION

TPE compounds of the present invention, based on isobutylene-containing TPV, SEEPS, and PE, provide gas barrier and compression set properties comparable to butyl rubber. As such, and with the advantage of being capable of being injection molded, plastic articles can be made from formulations of the present invention for such uses as seals, closures, and other articles previously made from butyl rubber, particularly medical container seals, syringe tips, syringe plunger tips. Other articles can be made from the TPE compound, such as the following industrial and consumer products: food and drink container seals, printer cartridge seals, and other products needing both flexibility and barrier properties, as a suitable replacement for butyl rubber.

EXAMPLES

Table 3 shows the ingredients for Examples 1-3 and Comparative Examples A-D. Table 4 shows the recipes and results of experimentation. What distinguishes Examples 1-3 from Comparative Examples A-C is the presence of SEEPS and PPE along with Sibstar TPV. The use of those two polymers contributes the micro-structure of the dispersed phase within the Sibstar TPV matrix, resulting in a lower compression set.

All of Examples 1-3 and A-D were made using a twin-screw extruder set at 215° C. in 1-3 zones; 260° C. in 7-8 zones; 215° C. in 11-12 zones, rotating at 400 rpm. All ingredients except for Indopol plasticizer were added before Zone 1. Indopol plasticizer was injected to Zone 3 at a prescribed feed rate during mixing. The melt-mixed compound was pelletized for further handling.

Pellets of all Examples 1-3 and A-C were molded into tensile test bars using a Boy injection molding machine, operating at 235° C. temperature and high pressure.

Using ASTM D395, Method B, each of Examples 1-3 and Comparative Examples A-C were tested for compression set.

TABLE 3

Source of Ingredients

| Ingredient Name | Purpose | Generic Name | Commercial Source |
|---|---|---|---|
| SIBSTAR E1140B | Rubber | Cross-linked isobutylene with HDPE | Kaneka Texas Corporation (Pasadena, TX) |
| SIBSTAR P1140B | Rubber | Cross-linked isobutylene with polypropylene | Kaneka Texas Corporation |
| Septon 4055 | Elastomer | SEEPS | Kuraray Co., Ltd (Pasedena, TX) |
| Kraton G1633 | Elastomer | SEBS | Kraton Polymer (Houston, TX) |
| Indopol H-300 | Plasticizer | Polybutene | Ineos Capital Ltd. (Whiting, IN) |
| Puretol 550 vis oil | Plasticizer | USP White Mineral Oil | Petrocanada (Toronto, ON) |
| Novapol Sclair 2714 | Thermoplastic | HDPE | Nova (Calgary) |
| Alathon L5886 | Thermoplastic | HDPE | Equistar (Houston) |
| MF650W | Thermoplastic | PP | Basell (Elkton, MD) |
| Formolene 1102KR | Hardness modifier | PP | Formosa (Point Comfort, TX) |
| LXR040C | Hard phase modifier | PPE | Blue Star (Ruicheng, China) |
| Vicron 25-11 | Filler | Calcium Carbonate | Specialty Minerals (Bethlehem, PA) |
| EPON 1004F | Epoxy resin | Filler coating | Shell Chemicals (Pasadena, TX) |
| Kemamide E | Slip aid | | Crompton (Middlebury, CT) |
| Irganox 168 | Secondary Antioxidant | | Ciba (Tarrytown, NY) |
| Irganox 1010 | Primary Antioxidant | | Ciba |

TABLE 4

Recipes and Properties

| Ingredient Name (Wt. %) | 1 | 2 | 3 | A | B | C | D |
|---|---|---|---|---|---|---|---|
| SIBSTAR E1140B | 49.5 | 47.2 | 27.4 | 88.1 | 71.0 | | |
| SIBSTAR P1140B | | | | | | 79.1 | |
| Septon 4055 | 9.9 | 9.5 | 11 | | | | |
| Kraton G1633 | | | | | | | 15.1 |
| Indopol H-300 | 19.9 | 18.9 | 27.4 | | 10.7 | | |
| 550 vis oil | | | | | | | 37.6 |
| Novapol Sclair 2714 | | | | 11.5 | 17.8 | | |
| Alathon L5886 | | 4.7 | 6 | | | | 6 |
| MF650W | 5.5 | 5.2 | | | | 4.7 | |

TABLE 4-continued

Recipes and Properties

| Ingredient Name (Wt. %) | 1 | 2 | 3 | A | B | C | D |
|---|---|---|---|---|---|---|---|
| Formolene 1102KR | | | | | | | 6 |
| LXR040C | 5 | 4.7 | 6 | | | | 4.5 |
| Vicron 25-11 | 9.9 | 9.5 | 21.9 | | | 15.8 | 30.1 |
| EPON 1004F | | | | | | | 0.23 |
| Kemamide E | 0.1 | 0.1 | 0.1 | 0.2 | 0.3 | 0.2 | |
| Irganox 168 | 0.1 | 0.1 | 0.1 | 0.1 | 0.1 | 0.1 | 0.23 |
| Irganox 1010 | 0.1 | 0.1 | 0.1 | 0.1 | 0.1 | 0.1 | 0.23 |
| Total | 100 | 100 | 100 | 100 | 100 | 100 | 100 |

Test Results

| | 1 | 2 | 3 | A | B | C | D |
|---|---|---|---|---|---|---|---|
| Shore A Hardness (ASTM D2240, 10 s delay) | 47 | 59 | 56 | 62 | 67 | 53 | 57 |
| Specific Gravity (ASTM D792) | 0.97 | 0.98 | 1.06 | 0.9 | 0.91 | 1.01 | 1.12 |
| Tensile Strength, psi (ASTM D412, Die C) | 305 | 448 | 349 | 424 | 487 | 290 | 753 |
| Elongation, % (ASTM D412, Die C) | 244 | 223 | 168 | 409 | 184 | 241 | 601 |
| Viscosity (Poise) @ 200° C., 1340 sec$^{-1}$ | 122 | 127 | 132 | 204 | 161 | 121 | 44 |
| Viscosity (Poise) @ 200° C., 223 sec$^{-1}$ | 435 | 451 | 504 | 652 | 497 | 451 | 172 |
| Compression Set @ 23° C., 22 hrs (ASTM D395 Method B) | 14.3 | 21.5 | 19.5 | 28.5 | 31 | 24.7 | 17.1 |
| Compression Set @ 70° C., 22 hrs (ASTM D395 Method B) | 18.4 | 22.8 | 21.1 | 37.9 | 37.7 | 30.6 | 22.5 |
| Oxygen Transmission Rate (OTR), cc·mil/m$^2$·day (ASTM D3985) | 7048 | 7543 | 6657 | 6000-7000 | 6000-7000 | 6000-7000 | >150,000 |

Table 4 shows that Examples 1-3 have superior (lower) compression set than Comparative Examples A-C. This result is achieved because the SEEPS is used with the TPV. This is shown most directly between Examples 1-3 and Comparative Examples A and B. Comparative Example C shows that without SEEPS, a compound using Sibstar™ P1140B is not acceptable because of poor tensile strength.

Table 4 also shows the oxygen transmission rates, which reveal that use of Sibstar™ TPV with SEEPS maintains a good barrier property to oxygen, in the range of 6000-8000 cc·mil/m$^2$·day. Comparative Example D shows that a typical formulation of SEBS, mineral oil, and filler may have acceptable compression set but quite unacceptable oxygen transmission rate.

Therefore, using Examples 1-3 and other explanations of the present invention in this document, one of ordinary skill in the art, without undue experimentation, will be able to formulate to achieve the appropriate balance of physical processing and physical performance properties while at the same time achieving superior oxygen barrier properties.

The invention is not limited to the above embodiments. The claims follow.

What is claimed is:

1. A thermoplastic elastomer compound, comprising:
   (a) thermoplastic vulcanizate (TPV) masterbatch of crosslinked polyisobutylene, polyolefin other than polybutene, and a plasticizer selected from the group consisting of polybutene, paraffin oil, and combinations of them;
   (b) styrene ethylene ethylene propylene styrene (SEEPS);
   (c) liquid polybutene;
   (d) additional polyolefin selected from the group consisting of polyethylene, polypropylene, and both polyethylene and polypropylene;
   (e) polyphenylene ether; and
   (f) optionally, filler;

wherein the compound has a compression set of less than about 22% when tested at 23° C. for 22 hours using ASTM D395 Test Method B.

2. The compound of claim 1, wherein the polyisobutylene in the TPV is dynamically crosslinked in the presence of the polyolefin other than polybutene and the plasticizer.

3. The compound of claim 1, wherein the compound comprises weight percents of ingredients of

| | |
|---|---|
| PIB-containing TPV | 25-60% |
| SEEPS | 8-12% |
| Liquid Polybutene Plasticizer | 15-30% |
| Polyolefin(s) | 5-10% |
| Polyphenylene Ether | 3-8% |
| Filler | 0-35% |
| Anti-oxidant | 0-1% |
| Other Optional Additives | 0-10% |

4. The compound of claim 1, further comprising additives selected from the group consisting of adhesion promoters; biocides (antibacterials, fungicides, and mildewcides), anti-fogging agents; anti-static agents; dispersants; fillers and extenders; fire and flame retardants and smoke suppressants; initiators; lubricants; micas; pigments, colorants and dyes; oils and plasticizers; processing aids; release agents; silanes, titanates and zirconates; slip and anti-blocking agents; stabilizers; stearates; ultraviolet light absorbers; viscosity regulators; waxes; and combinations of them.

5. The compound of claim 1, wherein the TPV further comprises styrene-isobutylene-styrene (SIBS) in addition to or in replacement of the polyolefin other than polybutene, provided that if the SIBS replaces the polyolefin, then no polybutene or paraffin oil is needed as a plasticizer.

6. The compound of claim 1, wherein the compound has an oxygen transmission rate of about 6000-8000 cc·mil/m$^2$·day.

7. A molded article, comprising a compound of claim 1.

8. A method of using the compound of claim 1, wherein the method comprises the step of molding the compound into an article that has reduced oxygen transmission and lower compression set than a compound which has the same TPV but no SEEPS or polyphenylene ether.

* * * * *